United States Patent
Cho et al.

(10) Patent No.: US 9,681,286 B2
(45) Date of Patent: *Jun. 13, 2017

(54) METHOD AND APPARATUS FOR CONFIRMING VALIDITY OF CANDIDATE COOPERATIVE DEVICE LIST FOR CLIENT COOPERATION IN WIRELESS COMMUNICATION SYSTEM

(71) Applicant: LG ELECTRONICS INC., Seoul (KR)

(72) Inventors: Hee Jeong Cho, Anyang-si (KR); Eun Jong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,933

(22) Filed: Jan. 12, 2016

(65) Prior Publication Data

US 2016/0135033 A1 May 12, 2016

Related U.S. Application Data

(63) Continuation of application No. 14/118,140, filed as application No. PCT/KR2012/004118 on May 24, 2012, now Pat. No. 9,301,123.

(Continued)

(51) Int. Cl.
*H04W 8/00* (2009.01)
*H04W 72/04* (2009.01)
(Continued)

(52) U.S. Cl.
CPC ........... *H04W 8/005* (2013.01); *H04W 12/10* (2013.01); *H04W 40/22* (2013.01);
(Continued)

(58) Field of Classification Search
CPC ...... H04W 8/00; H04L 12/2416; H04L 45/02; H04L 29/08648; H04L 29/08396;
(Continued)

(56) References Cited

U.S. PATENT DOCUMENTS 5,491,835 A * 2/1996 Sasuta et al. ................. 455/509
7,693,122 B2 * 4/2010 Carlson et al. ............... 370/341
(Continued)

FOREIGN PATENT DOCUMENTS

KR 10-2010-0094151 8/2010

OTHER PUBLICATIONS

"Updated text on Study Report Proposed by the Ad-hoc" IE EE 802. 16 Broadband Wireless Access Working Group, IEEE 802. 16 ppc-10/0007; Jung, et al. Mar. 10, 2011.

(Continued)

*Primary Examiner* — Warner Wong
(74) *Attorney, Agent, or Firm* — Dentons US LLP

(57) ABSTRACT

Provided are a method and an apparatus for confirming the validity of a candidate cooperative device list for client cooperation in a wireless communication system. A base station searches for at least one candidate cooperation device for a source device, then an effective period timer, for an effective time command list for a list of candidate cooperation devices for a source device, is initiated, and a determination is made as to whether the list of candidate cooperation devices is valid. The base station and the source device are connected through a first system, and the base station and one recommended candidate cooperation device selected from the list of candidate cooperation devices are connected through a second system.

15 Claims, 12 Drawing Sheets

Related U.S. Application Data

(60) Provisional application No. 61/490,073, filed on May 26, 2011, provisional application No. 61/490,075, filed on May 26, 2011, provisional application No. 61/490,076, filed on May 26, 2011, provisional application No. 61/494,898, filed on Jun. 9, 2011.

(51) Int. Cl.

| | | |
|---|---|---|
| *H04W 52/02* | (2009.01) | |
| *H04W 76/06* | (2009.01) | |
| *H04W 40/22* | (2009.01) | |
| *H04W 12/10* | (2009.01) | |
| *H04W 88/04* | (2009.01) | |
| *H04W 84/12* | (2009.01) | |

(52) U.S. Cl.
CPC ....... *H04W 52/0203* (2013.01); *H04W 72/04* (2013.01); *H04W 76/06* (2013.01); *H04W 76/068* (2013.01); *H04W 84/12* (2013.01); *H04W 88/04* (2013.01); *Y02B 60/50* (2013.01)

(58) Field of Classification Search
CPC ......... H04L 29/08405; H04L 29/12113; H04L 41/08; H04L 41/082; H04L 41/02; H04L 41/0866; H04L 41/12; H04L 67/1061; H04L 67/1063; H04L 67/1068
See application file for complete search history.

(56) References Cited

U.S. PATENT DOCUMENTS

| | | | |
|---|---|---|---|
| 8,175,064 B2 * | 5/2012 | Tan | H04B 7/2606 370/280 |
| 8,522,020 B2 | 8/2013 | Gerard | |
| 8,824,322 B2 | 9/2014 | Osterling et al. | |
| 8,917,643 B2 | 12/2014 | Lee et al. | |
| 9,002,394 B2 * | 4/2015 | Jang et al. | 455/517 |
| 9,161,373 B2 | 10/2015 | Frenger et al. | |
| 9,179,375 B2 | 11/2015 | Lim | |
| 2001/0005677 A1 | 6/2001 | Dempo et al. | |
| 2006/0178167 A1 | 8/2006 | Tamura et al. | |
| 2007/0002766 A1 | 1/2007 | Park et al. | |
| 2007/0180451 A1 * | 8/2007 | Ryan et al. | 718/104 |
| 2008/0137556 A1 * | 6/2008 | Park et al. | 370/255 |
| 2008/0247332 A1 * | 10/2008 | Sato | H04L 41/082 370/254 |
| 2009/0137246 A1 * | 5/2009 | Xing | H04W 56/0035 455/434 |
| 2009/0287827 A1 * | 11/2009 | Horn et al. | 709/227 |
| 2010/0011214 A1 | 1/2010 | Cha et al. | |
| 2010/0142407 A1 | 6/2010 | Serravalle | |
| 2010/0172267 A1 | 7/2010 | Viorel et al. | |
| 2010/0262664 A1 * | 10/2010 | Brown | H04L 47/323 709/206 |
| 2010/0272054 A1 | 10/2010 | Tatsuta et al. | |
| 2010/0296500 A1 | 11/2010 | Tang | |
| 2011/0034169 A1 * | 2/2011 | Roberts et al. | 455/435.3 |
| 2011/0077013 A1 * | 3/2011 | Cho et al. | 455/445 |
| 2011/0145419 A1 | 6/2011 | Shaheen et al. | |
| 2011/0170450 A1 * | 7/2011 | Juntti et al. | 370/252 |
| 2012/0106452 A1 | 5/2012 | Kneckt et al. | |
| 2012/0214492 A1 | 8/2012 | Mihaly et al. | |
| 2012/0314609 A1 * | 12/2012 | Chang | H04B 7/15592 370/252 |
| 2013/0021981 A1 * | 1/2013 | Huang et al. | 370/328 |
| 2013/0029591 A1 * | 1/2013 | Park et al. | 455/7 |
| 2013/0034038 A1 * | 2/2013 | Jang et al. | 370/312 |
| 2013/0286882 A1 * | 10/2013 | Lim et al. | 370/252 |
| 2013/0308490 A1 * | 11/2013 | Lim et al. | 370/252 |
| 2014/0092800 A1 * | 4/2014 | Cho et al. | 370/311 |
| 2014/0179326 A1 * | 6/2014 | Cho et al. | 455/445 |

OTHER PUBLICATIONS

"Coordinated AP for tightly coupled BS-Ap interworking for Multi-RAT device" IEEE 802.16 Broadband Wireless Access Working Group, IEEE C802, 16 ppc-10/0078; Yuk, et al. Jan. 5, 2011.

* cited by examiner

FIG. 3

| Frame control | Duration /ID | Address 1 | Address 2 | Address 3 | Sequence control | Address 4 | Sequence control | QoS control | HT control | Frame body | FCS |

METHOD AND APPARATUS FOR CONFIRMING VALIDITY OF CANDIDATE COOPERATIVE DEVICE LIST FOR CLIENT COOPERATION IN WIRELESS COMMUNICATION SYSTEM

This application is a Continuation of U.S. application Ser. No. 14/118,140, filed Nov. 15, 2013, which is a 35 USC §371 National Stage entry of International Application No. PCT/KR2012/004118 filed on May 24, 2012, and claims priority to U.S. Provisional Application Nos. 61/490,073, filed May 26, 2011, 61/490,075 filed May 26, 2011; 61/490,076, filed May 26, 2011, and 61/494,898 filed Jun. 9, 2011, all of which are incorporated by reference in their entirety herein.

BACKGROUND OF THE INVENTION

Field of the Invention

The present invention relates to wireless communications, and more particularly, a method and apparatus for confirming validity of a candidate cooperative device list for client cooperation in a wireless communication system.

Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a client cooperation technique may be introduced in a wireless communication system. The client cooperation technique refers to a technique by which a specific device helps transmission of another device. That is, one device may directly communicate with a base station (BS) or may indirectly communication with the BS by the aid of another device. The client cooperation technique has an effect of lower power consumption, throughput enhancement, etc. The client cooperation technique can be more effectively used in a multi-radio access technology (RAT) device. The multi-RAT device refers to a device that can operate in a plurality of communication systems. For example, the multi-RAT device can operate both in institute of electrical and electronics engineers (IEEE) 802.16m and IEEE 802.11. To provide an easiness access to the BS anytime anywhere and to maintain effective performance, the multi-RAT device can use a multi-RAT client cooperation technique (i.e., improved tethering) in a heterogeneous network. A base station may search for a device capable of performing client cooperation to perform a client cooperation technology, and a source device, being connected to a searched device, may communicate with the base station through client cooperation. A searched device may become the device valid or invalid for client cooperation depending on various conditions such as movement of the source device. Therefore, it is required to confirm validity of discovered devices for client cooperation and to define a time period for which information of the corresponding devices is retained.

SUMMARY OF THE INVENTION

The present invention provides a method and apparatus for confirming validity of a candidate cooperative device list for client cooperation in a wireless communication system. The present invention provides a method for confirming validity of a list of candidate cooperative devices which can function as cooperative devices for client cooperation. Also, a timer which specifies a time period for which a candidate cooperative device list and information on candidate cooperative devices are retained is newly defined.

In an aspect, a method for confirming, by a base station, validity of a list of candidate cooperative devices for client cooperation in a wireless communication system is provided. The method includes searching for at least one candidate cooperative device for a source device, starting a list valid period timer indicating valid time of a candidate cooperative device list for the source device, and determining whether the candidate cooperative device list is valid. The base station and the source device are connected to each other through a first system, and the base station and one recommended candidate cooperation device selected from the candidate cooperation device list are connected to each other through a second system.

The valid time may indicate a time period during which a result of the search for the at least one candidate cooperative device for the source device is valid.

The valid time may indicate a time period during which a neighbor candidate cooperative device list of the source device received from the source device is valid.

The valid time may be the same or different from each other for each candidate cooperative device among the candidate cooperative device list.

If the valid time is the same for each of candidate cooperative devices among the candidate cooperative device list, the valid time may be one of a minimum value, an average value, or a maximum value of valid time of each candidate cooperative device among the candidate cooperative device list.

If the at least one candidate cooperative device for the source device is discovered while the list valid period timer is operating, the method may further include restarting the list valid period timer.

Whether the candidate cooperative device list is valid may be determined when the list valid period timer expires.

Whether the candidate cooperative device list is valid may be determined when an estimation of a location of the source device exceeds a predetermined range, or moving speed of the source device is changed.

Whether the candidate cooperative device list is valid may be determined when it is determined that the candidate cooperative device list is outdated based on a timestamp value of the candidate cooperative device list.

The method may further include starting a list holding timer within the base station, and holding information on the candidate cooperative device list and the source device for a time period indicated by the list holding timer.

Time indicated by the list holding timer may be defined by a pre-fixed value.

The method may further include transmitting the time period indicated by the list holding timer to the source device.

The list holding timer may start when the candidate cooperative device list is updated.

If the list holding timer expires, the method may further include deleting the information on the candidate cooperative device list and the source device.

The first system may be one of institute of electrical and electronics engineers (IEEE) 802.16, IEEE 802.16m, IEEE 802.20, evolved-UMTS terrestrial radio access (E-UTRA), $3^{rd}$ generation partnership project (3GPP) long-term evolution (LTE), or 3GPP LTE-A (advanced), and the second system may be IEEE 802.11.

In another aspect, a base station for client cooperation in a wireless communication system is provided. The base station includes a radio frequency (RF) unit for transmitting or receiving a radio signal, and a processor connected to the RF unit, and configured to search for at least one candidate cooperative device for a source device, start a list valid period timer indicating valid time of a candidate cooperative device list for the source device, and determine whether the candidate cooperative device list is valid. The base station and the source device are connected to each other through a first system, and the base station and one recommended candidate cooperation device selected from the candidate cooperation device list are connected to each other through a second system.

A list for candidate cooperative devices for client cooperation can be managed in an effective manner.

BRIEF DESCRIPTION OF THE DRAWINGS

FIG. 3 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m and IEEE 802.11 are chiefly described as an example in order to clarify the description, but the technical spirit of the present invention is not limited to IEEE 802.16m and IEEE 802.11.

Figure 1:
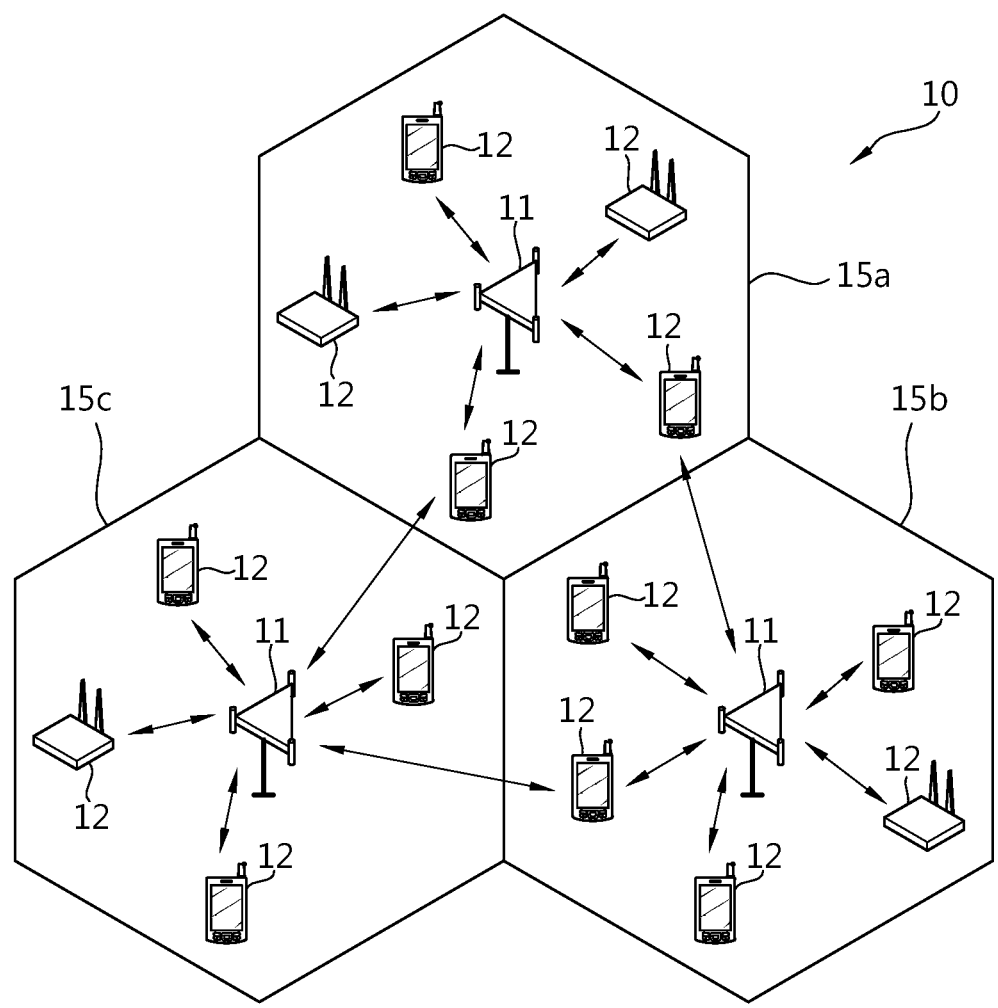
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
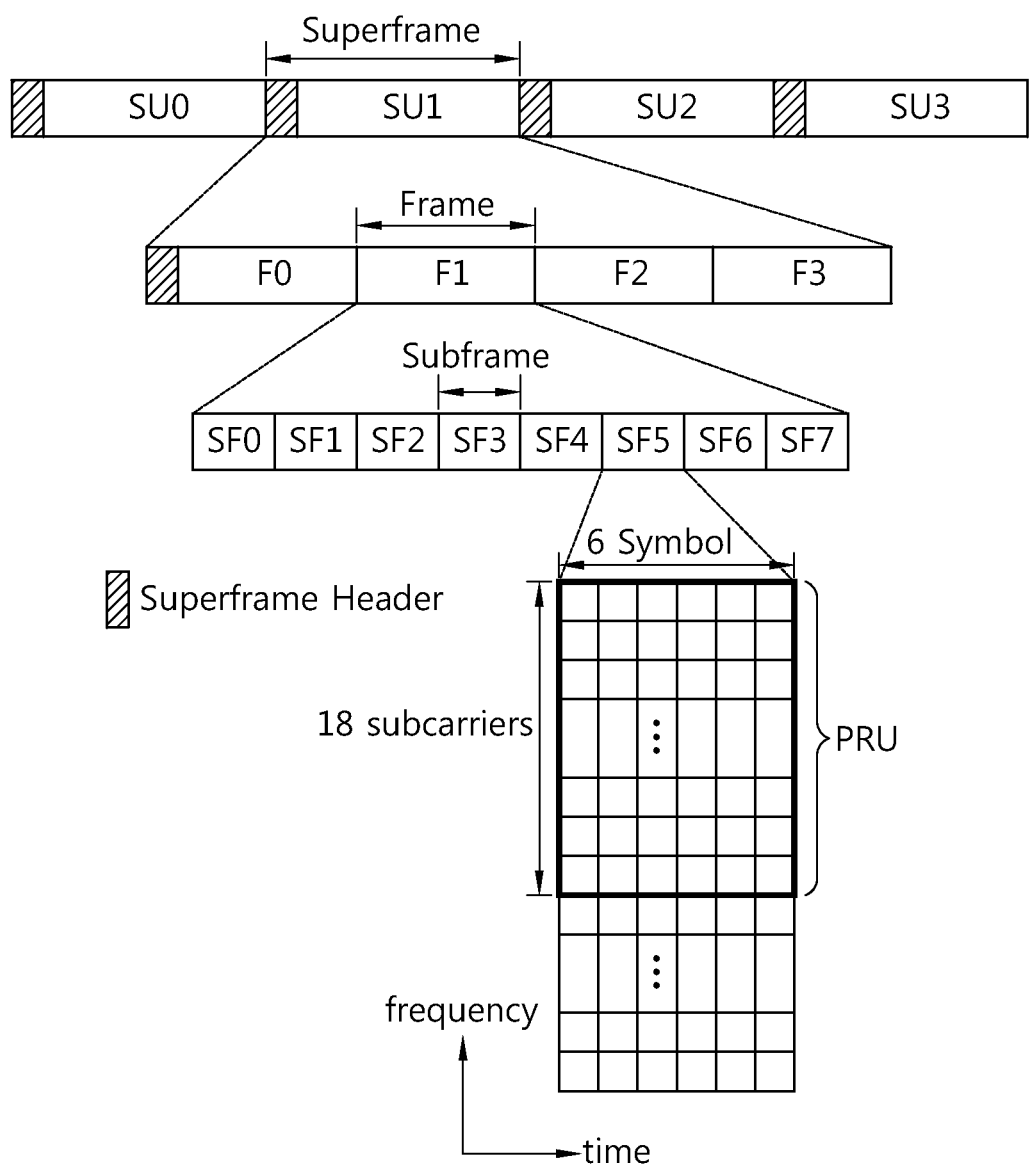
FIG. 2 shows an example of a frame structure of IEEE 802.16m.

FIG. 2 shows an example of a frame structure of IEEE 802.16m.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SFS5, SF6, and SF7.

Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame. Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | | 5 | 7 | 8.75 | 10 | 20 |
|---|---|---|---|---|---|---|---|
| Channel bandwidth, BW(MHz) | | | 5 | 7 | 8.75 | 10 | 20 |
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f(kHz)$ | | | 10.94 | 7.81 | 9.77 | 10.94 | 10.94 |
| Useful symbol time $T_b(\mu s)$ | | | 91.4 | 128 | 102.4 | 91.4 | 91.4 |
| G = 1/8 | Symbol time, $T_s(\mu s)$ | | 102.857 | 144 | 115.2 | 102.857 | 102.857 |
| | FDD | Number of ODFMA symbols per 5 ms frame | 48 | 34 | 43 | 48 | 48 |
| | | Idle time($\mu s$) | 62.857 | 104 | 46.40 | 62.857 | 62.857 |
| | TDD | Number of ODFMA symbols per 5 ms frame | 47 | 33 | 42 | 47 | 47 |
| | | TTG + RTG($\mu s$) | 165.714 | 248 | 161.6 | 165.714 | 165.714 |
| G = 1/16 | Symbol time, Ts($\mu s$) | | 97.143 | 136 | 108.8 | 97.143 | 97.143 |
| | FDD | Number of ODFMA symbols per 5 ms frame | 51 | 36 | 45 | 51 | 51 |
| | | Idle time($\mu s$) | 45.71 | 104 | 104 | 45.71 | 45.71 |
| | TDD | Number of ODFMA symbols per 5 ms frame | 50 | 35 | 44 | 50 | 50 |
| | | TTG + RTG($\mu s$) | 142.853 | 240 | 212.8 | 142.853 | 142.853 |
| G = 1/4 | Symbol time, $T_s(\mu s)$ | | 114.286 | 160 | 128 | 114.286 | 114.286 |
| | FDD | Number of ODFMA symbols per 5 ms frame | 43 | 31 | 39 | 43 | 43 |
| | | Idle time($\mu s$) | 85.694 | 40 | 8 | 85.694 | 85.694 |
| | TDD | Number of ODFMA symbols per 5 ms frame | 42 | 30 | 38 | 42 | 42 |
| | | TTG + RTG($\mu s$) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)×8000. A subcarrier spacing is defined as $\Delta f=F_s/NFFT$. A useful symbol time is defined as $T_b=1/\Delta f$. A CP time is defined as $T_g=G·T_b$. An OFDMA symbol time is defined as $T_s=T_b+T_g$. A sampling time is defined as $T_b/N_{FFT}$.

FIG. 3 shows an example of a frame structure of IEEE 802.11.

A frame of IEEE 802.11 includes a set of fields in a fixed order. Referring to FIG. 3, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A deauthentication frame is used to finish an authentication relation. An association request frame is transmitted so that the mobile station participates in the network when the mobile station recognizes the compatible network and is authenticated. An association response frame is a response for the association request frame. A deassociation frame is used to finish an association relation.

Three states may exist according to an authentication and association procedure in IEEE 802.11. Table 2 below shows the three states of IEEE 802.11.

TABLE 2

|  | Authentication | Association |
| --- | --- | --- |
| State 1 | X | X |
| State 2 | ○ | X |
| State 3 | ○ | ○ |

To transmit a data frame, a device must perform the authentication and association procedure with respect to a network. In Table 2, a procedure of transitioning from the state 1 to the state 2 can be called the authentication procedure. The authentication procedure can be performed in such a manner that one device acquires information of a different device and authenticates the different device. The information of the different device can be acquired by using two methods, i.e., a passive scanning method for acquiring information of a different node by receiving a beacon frame and an active scanning method for acquiring the information of the different device by transmitting a probe request message and receiving a probe response message received in response thereto. The authentication procedure can be complete by exchanging an authentication request frame and an authentication response frame.

In Table 2, a procedure of transitioning from the state 2 to the state 3 can be called the association procedure. The association procedure can be complete when two devices exchange the association request frame and the association response frame upon completion of the authentication procedure. An association ID can be allocated by the association procedure.

A client cooperation technique may be introduced in a wireless communication system. One device may directly communicate with a base station (BS) or may indirectly communication with the BS by the aid of another device. Hereinafter, a source device refers to a device which communicates with the BS through a connection with another device. A cooperative device refers to a relay entity which helps the source device to communicate with the BS. The client cooperation technique has an effect of lower power consumption. In terms of a device, a path-loss can be decreased by the client cooperation technique, thereby being able to decrease transmit power. In terms of a network, total network power consumption can be decreased. In addition, the client cooperation technique has an effect of throughput enhancement. In terms of a device, a source device can use a good-quality link between a cooperative device and a BS and between BSs. In addition, an antenna extension gain can be obtained. In terms of the network, network capacity can be increased by using client clustering based on frequency reuse without an additional infrastructure.

Figure 4:
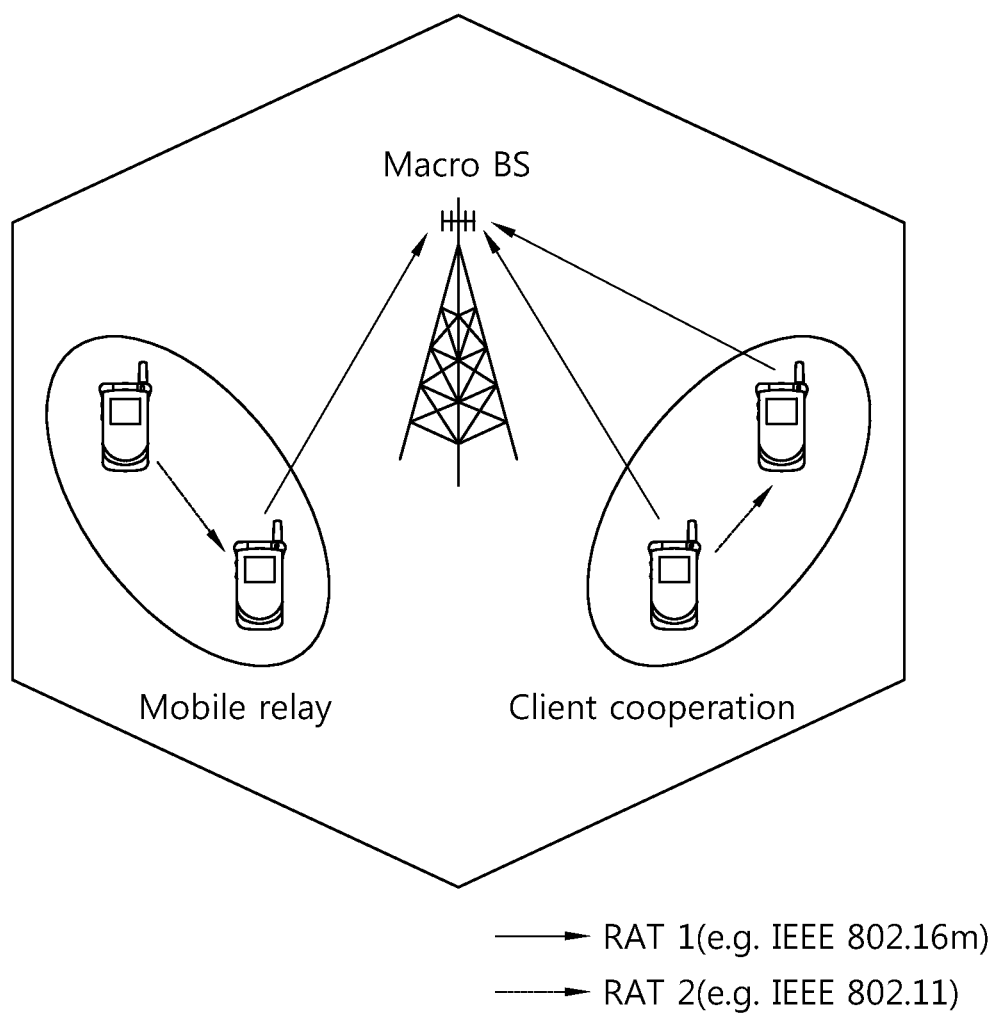
FIG. 4 shows an example of implementing a client cooperation technique.

FIG. 4 shows an example of implementing a client cooperation technique. Referring to FIG. 4, in the client cooperation technique, a source device can directly communicate with a macro BS, or can communicate with the macro BS via a cooperative device. The cooperative device may directly communicate with the macro BS, or can help communication of the source device. This is different from a mobile relay in a sense that the source device can directly communicate with the macro BS. In this case, each device and the macro BS can communicate by using a first radio access technology (RAT), and the source device and the cooperative device can communicate by using a second RAT. The first RAT may be a radio technology such as IEEE 802.16 (WiMAX), IEEE 802.16m or IEEE 802.20, etc. Alternatively, the first RAT may be a radio technology such as E-UTRA, 3GPP LTE or 3GPP LTE-A, etc. The second RAT may be IEEE 802.11.

Figure 5:
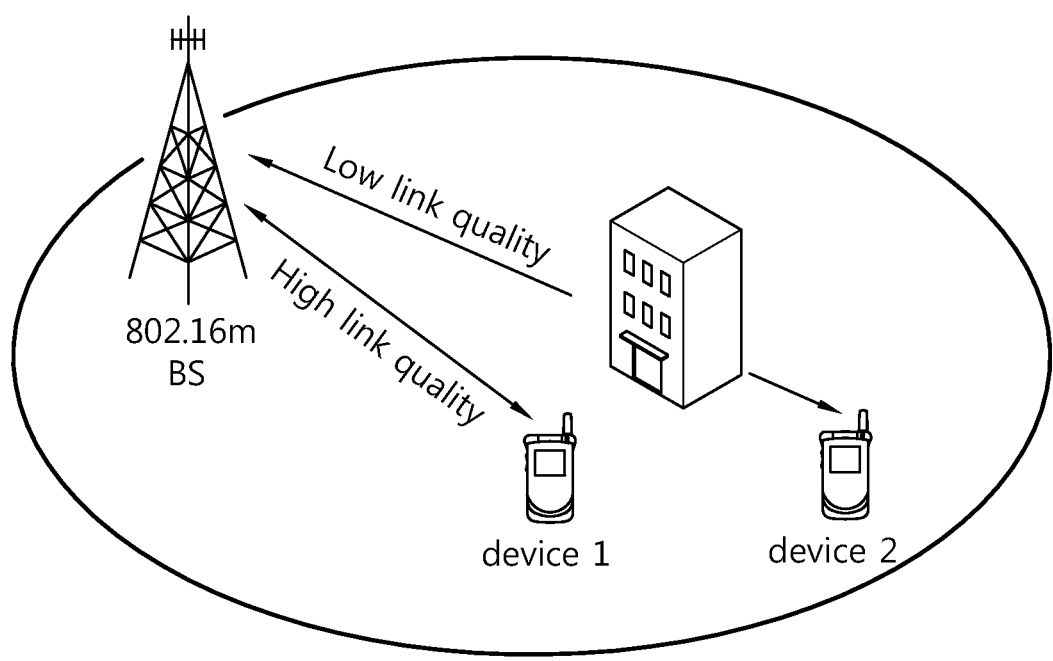
FIG. 5 shows another example of implementing a client cooperation technique.

FIG. 5 shows another example of implementing a client cooperation technique.

The client cooperation technique can be more effectively used in a multi-RAT device. The multi-RAT device refers to a device that can operate in a plurality of communication systems. For example, the multi-RAT device can operate both in IEEE 802.16m and IEEE 802.11. When the multi-RAT device uses the client cooperation technique, the multi-RAT device can communicate with an IEEE 802.16m BS by using a plurality of RATs. For example, as shown in FIG. 5, if channel quality is poor between a second device and a BS or if the second device located in a shadow area cannot receive a signal from the BS, the first device can be used as a cooperative device to communicate with the BS. In this case, each device and the BS can communicate by using the first RAT, and the source device and the cooperative device can communicate by using the second RAT. The first RAT may be a radio technique such as IEEE 802.16, IEEE 802.16m, IEEE 802.20, E-UTRA, 3GPP LTE or 3GPP LTE-A, etc. The second RAT may be IEEE 802.11.

Figure 6:
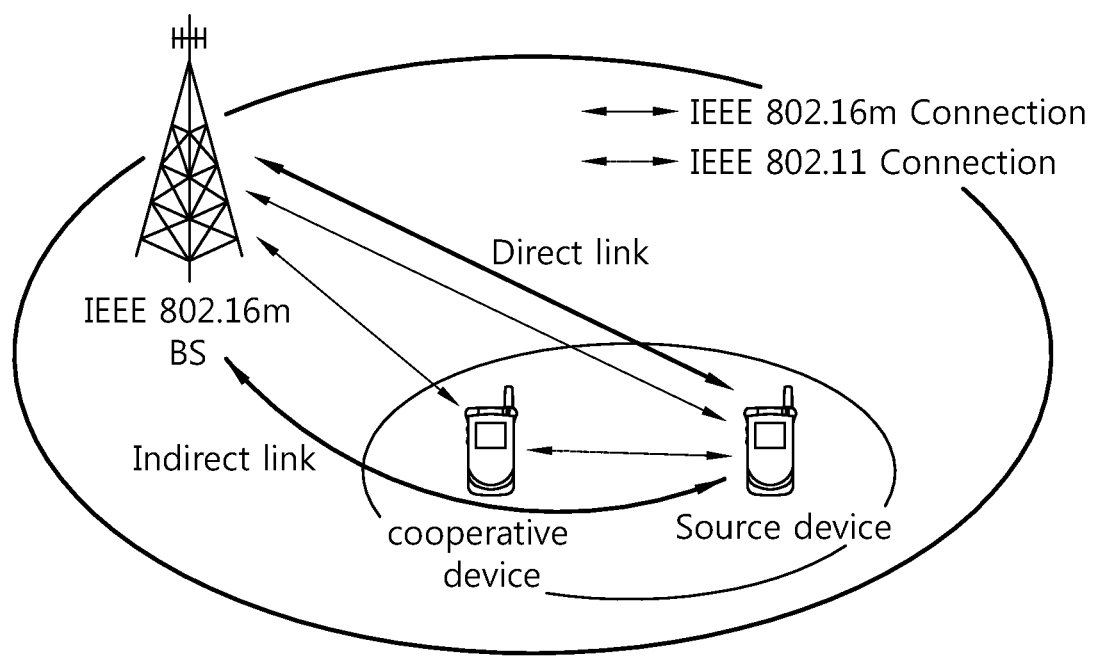
FIG. 6 shows another example of implementing a client cooperation technique.

FIG. 6 shows another example of implementing a client cooperation technique.

A source device and a macro BS (e.g., IEEE 802.16m BS) can be connected through a direct link, and can be connected through an indirect link by using a cooperative device. In this case, each device and the BS can be connected by using IEEE 802.16m, and the source device and the cooperative device can be connected by using IEEE 802.11.

In what follows, a method for connecting multi-RAT devices to each other to perform a client cooperation technology will be described. Hereinafter, it is assumed that a multi-RAT device attempting to connect to a first RAT base station through client cooperation is denoted as a source device while a device that may be connected to the source device through a second RAT for client cooperation is denoted as a candidate cooperative device. When a candidate cooperative device is connected to a source device through the second RAT and performs client cooperation, the candidate cooperative device may be a cooperative device of client cooperation. In what follows, it is assumed that the first RAT is the IEEE 802.16m, and the second RAT is the IEEE 802.11, but the present invention is not limited to thereto. Before details of a connection procedure for multi-RAT devices, a device discovery procedure is described first. A device discovery procedure may be carried out before a connection procedure. Through the device discovery procedure, a base station and/or a source device may search for a candidate cooperative device which may function as a cooperative device for client cooperation. In general, the device discovery procedure may be performed by exchanging a beacon message or a probe request/response message.

The base station searches for a candidate cooperative device and informs the source device of a list including one or more candidate cooperative devices. The list may include information such as a device identifier (ID), a media access control (MAC) address, a beacon interval, and so on. Also, the base station may inform the source device of a candidate cooperative device deemed relatively suitable for performing client cooperation with the source device. Such a kind of device may be called a recommended candidate cooperative device. In other words, recommended cooperative devices may form a subset of a list including at least candidate cooperative devices. A recommended device may be determined based on a total number of source devices, speed of source devices, and so on.

A source device may utilize information about candidate cooperative devices or recommended cooperative devices provided by a base station. The source device may transmit a unicast probe request message to each of candidate cooperative devices or recommended cooperative devices and may perform a subsequent procedure. The source device may ignore a beacon message transmitted from a different device other than each of candidate cooperative devices or recommended cooperative devices.

In what follows, a connection procedure between a source device and a candidate cooperative device will be described. The connection procedure may be initiated by a source device or a base station. If the connection procedure is initiated by a source device, the source device may request a base station to start the connection procedure and set up a connection to a candidate cooperative device which can support client cooperation. If the connection procedure is initiated by a base station, the base station may request a source device to start the connection procedure, and the source device may set up a connection to a candidate cooperative device which can support client cooperation. In general, the device discovery procedure may be carried out by exchanging an authentication request/response message or an association request/response message.

1) First of all, a case where the connection procedure is initiated by a source device is described.

Figure 7:
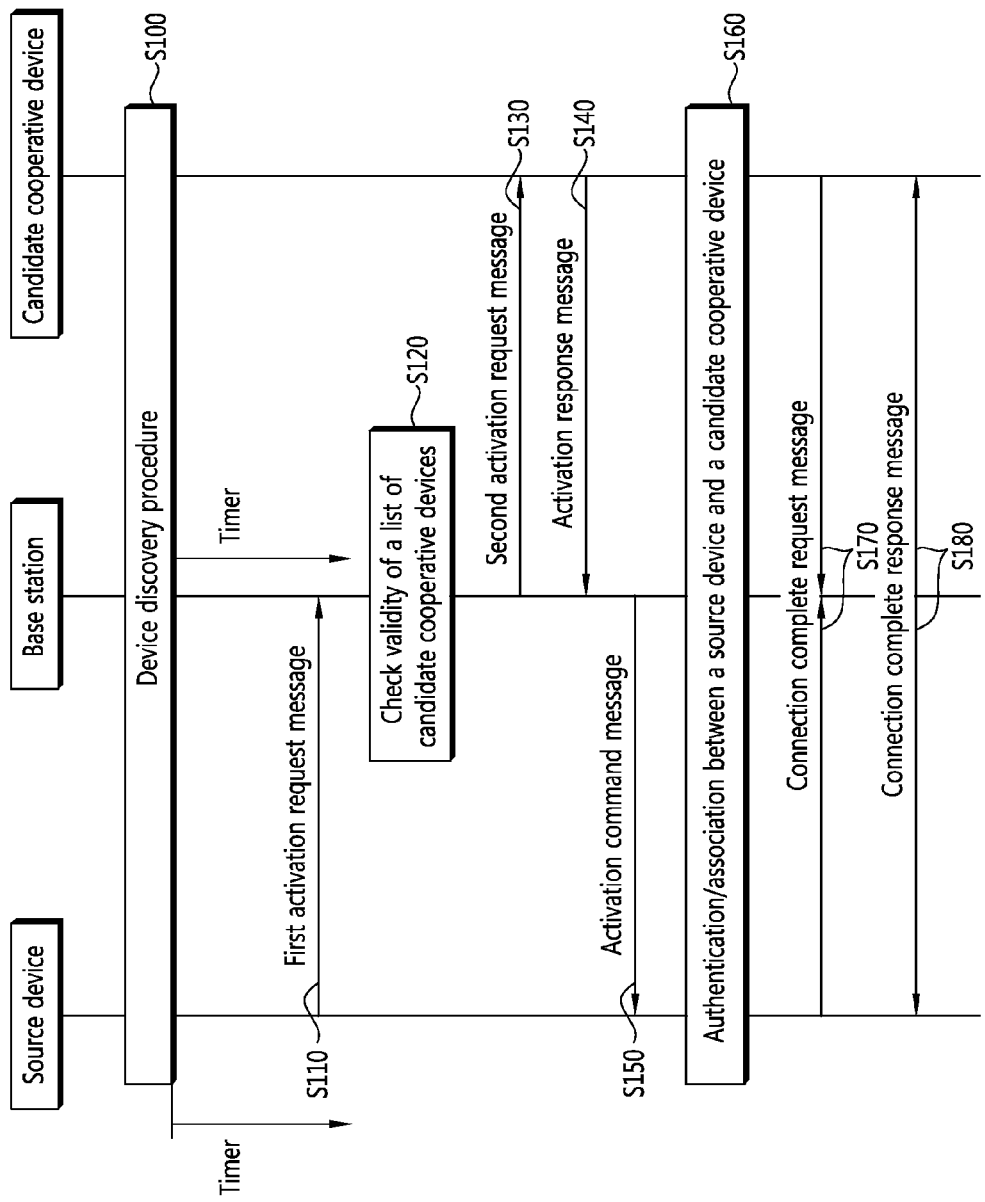
FIG. 7 shows an example of a method for setting a connection according to an embodiment of the present invention.

FIG. 7 shows an example of a method for setting a connection according to an embodiment of the present invention.

In step S100, at least one candidate cooperative device is discovered as a result of a device discovery procedure. Once the device discovery procedure is completed, a list holding timer within the base station and the source device starts. While the list holding timer is operating, the list of candidate cooperative devices within each of the base station and the source device is retained.

In step S110, the source device transmits a first activation request message to the base station. The first activation request message may include the following parameters.

A list of candidate cooperative devices maintained by the source device: this list may be included in the first activation request message only when the list holding timer expires, or the list of candidate cooperative devices is changed. The list of candidate cooperative devices maintained by the source device may be changed when the source device reconfirms the candidate cooperative devices independently.

A list of neighbor devices maintained by the source device: this list may be a list of neighbor devices discovered by the source device without assistance of the base station. In other words, the list may be a list of devices not identified as a candidate cooperative device.

The latest timestamp of a list of candidate cooperative devices maintained by the source device: this parameter indicates one particular time point at which the list of candidate cooperative devices is updated.

Information on location of the source device: this information may be included if the source device's location has been changed. The information on location of the source device may include at least one of absolute location of the source device or relative location of a neighbor IEEE 802.11 access point (AP).

Indication of whether to maintain an IEEE 802.16m connection: this parameter indicates whether to maintain a connection between the source device and the base station if a connection between the source device and the candidate cooperative devices is established, and thus client cooperation is carried out.

Referring to FIG. 7 again, in step S120, upon receiving the first activation request message from the source device, the base station determines whether the list of candidate cooperative devices is valid. If it is determined that the list of candidate cooperative devices is valid, the base station may select candidate cooperative devices appropriate for client cooperation. At this time, the base station may select candidate cooperative devices appropriate for client cooperation based on the list of candidate cooperative devices received from the source device (if the list is included in the first activation request message), information on at least one candidate cooperative device within the list of candidate cooperative devices maintained by the base station (if the list holding timer is in operation), or information on location of the source device, etc. Also, the base station may select candidate cooperative devices appropriate for client cooperation based on a total number of source devices, speed of source devices, etc.

In step S130, the base station transmits a second activation request message to the selected candidate cooperative device. In step S140, the base station receives from the selected candidate cooperative device an activation response message as a response to the second activation request message. By exchanging the second activation request message and the activation response message, the base station may negotiate the selected candidate cooperative device about an activation time point of radio frequency (RF) for multi-RAT client cooperation, capability of performing client cooperation, etc.

In step S150, the base station transmits an activation command message to the source device. The base station may inform the source device of decisions made between the base station and the candidate cooperative device through the activation command message. In other words, the activation command message may include a result of the activation request of the source device. If the result of the activation request of the source device is successful, the activation command message may include the following parameters.

Multi-RAT information of a candidate cooperative device capable of performing client cooperation: this information may include the MAC address of the candidate cooperative device, type and version of a system type which allows operation of the candidate cooperative device, security association, etc.

Multi-RAT random access time: for example, this may be a frame offset or a frame number.

Indication of whether to maintain IEEE 802.16m connection: this parameter indicates whether to continuously maintain a connection between the source device and the base station if a connection between the source device and the candidate cooperative device is completed and thus client cooperation is performed. If the IEEE 802.16m connection between the source device and the base station is not maintained, the activation command message may include action time which indicates absolute time or relative time, or both at which a data and a control signal are transmitted through a multi-RAT connection, and disconnection time which indicates absolute time or relative time, or both at which the IEEE 802.16m connection is terminated.

Upon receiving the activation command message, in step S160, the source device may perform an authentication and an association procedure for the candidate cooperative device.

In step S170, the source device and the candidate cooperative device may each transmit a connection complete request message for client cooperation to the base station. Through the connection complete request message, a result of the performing the authentication and the association procedure may be transmitted. Also, the connection complete request message transmitted by the source device may include the parameter indicating whether to maintain the IEEE 802.16m connection. In step S180, the base station transmits a connection complete response message for client cooperation to each of the source device and the candidate cooperative device. The connection complete response message may include an address to be used for multi-RAT client cooperation, security information of the IEEE 802.16m, etc. The address may correspond to a local ID dedicated to client cooperation or a local ID of the source device. The connection compete response message may include a parameter indicating whether to maintain the IEEE 802.16m connection.

Meanwhile, the base station may receive the connection complete request message from one or more candidate cooperative devices. Then the base station may select one candidate cooperative device and transmit the connection complete response message thereto. Also, in case of device-to-device direct communication, the corresponding device and base station may select a plurality of devices and set up a connection with each of the devices.

Figure 8:
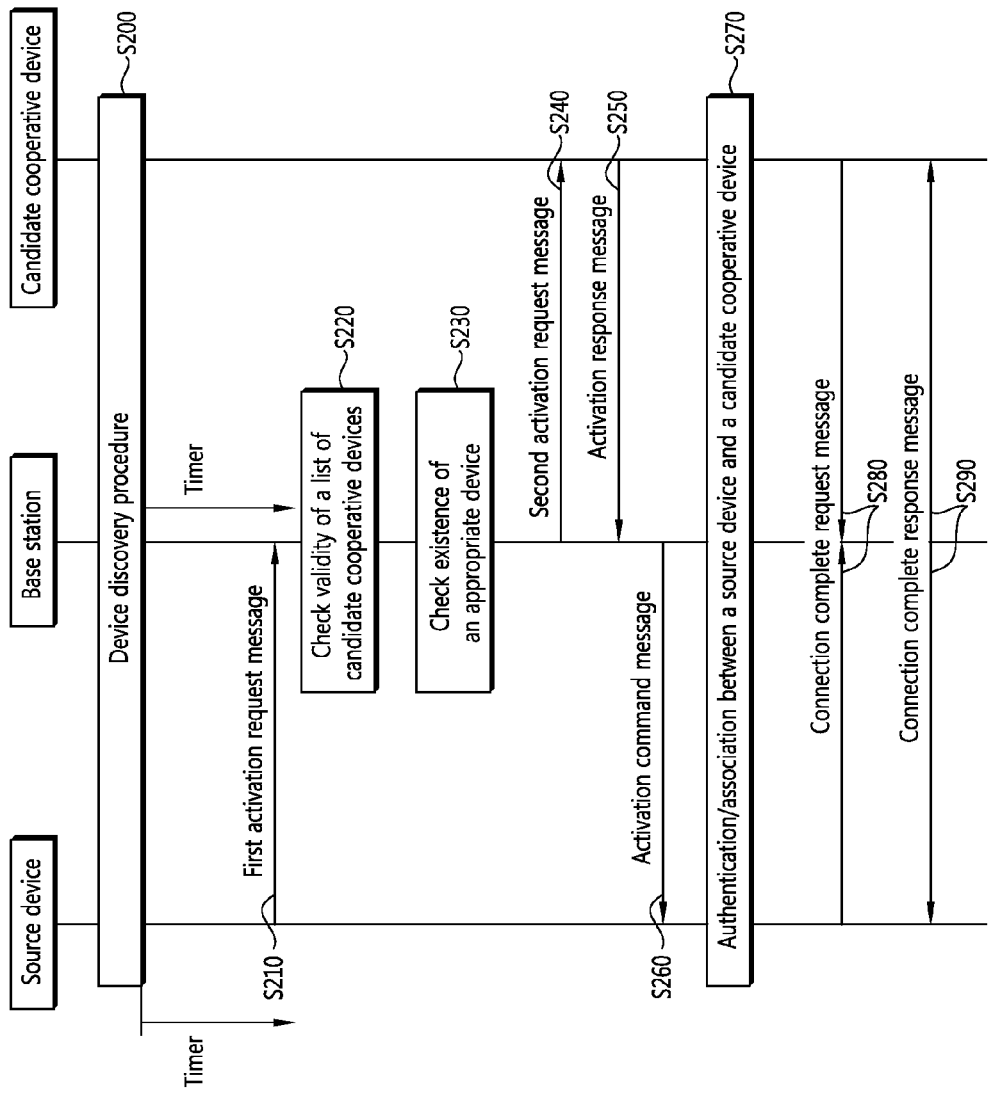
FIG. 8 shows an example of a method for setting a connection according to another embodiment of the present invention.

FIG. 8 shows an example of a method for setting a connection according to another embodiment of the present invention.

In step S200, at least one candidate cooperative device is discovered from the device discovery procedure. In step S210, the source device transmits a first activation request message to the base station. As described above in FIG. 7, the first activation request message may include a list of candidate cooperative devices maintained by the source device, a list of neighbor devices maintained by the source device, the latest timestamp of the list of candidate cooperative devices maintained by the source device, information on location of the source device, indication of whether to maintain IEEE 802.16m connection, etc. In step S220, upon receiving the first activation request message from the source device, the base station determines whether the list of candidate cooperative devices is valid.

The base station may determine that the list of candidate cooperative devices is not valid. Then, in step S230, the base station may check existence of other devices appropriate for client cooperation. For example, if the base station receives a list of neighbor devices maintained by the source device through the first activation request message, the base station may determine whether a device belonging to the corresponding list is appropriate as a cooperative device. According to the checking result, the base station may select a candidate cooperative device appropriate for client cooperation. Similarly, if the base station receives information on location of the source device through the first activation request message, the base station may select a candidate cooperative device for client cooperation based on the absolute location or relative location of the source device, or both.

In step S240, the base station transmits a second activation request message to the selected candidate cooperative device. In step S250, the base station receives an activation response message as a response to the second activation request message from the selected candidate cooperative device. By exchanging the second activation request message and the activation response message, the base station may negotiate the selected candidate cooperative device about activation time of RF for multi-RAT client cooperation, capability of performing client cooperation, etc. In step S260, the base station transmits an activation command message to the source device. The activation command message may include a result of the activation request of the source device. If the result of the activation request of the source device is successful, the activation command message may include parameters such as multi-RAT information of the candidate cooperative device capable of performing client cooperation, multi-RAT random access time, an indicator of whether to maintain the IEEE 802.16m connection, etc., as described above in FIG. 7.

Upon receiving an activation command message, in step S270, the source device may perform an authentication and an association procedure for the candidate cooperative device. In step S280, the source device and the candidate cooperative device may each transmit a connection complete request message for client cooperation to the base station. Through the connection complete request message, a result of performing the authentication and the association procedure may be transmitted. In step S290, the base station a connection complete response message for client cooperation to each of the source device and the candidate cooperative device. The connection complete request message may include and address used for multi-RAT client cooperation, security information of the IEEE 802.16m, a parameter indicating whether to maintain the IEEE 802.16m connection, etc.

Figure 9:
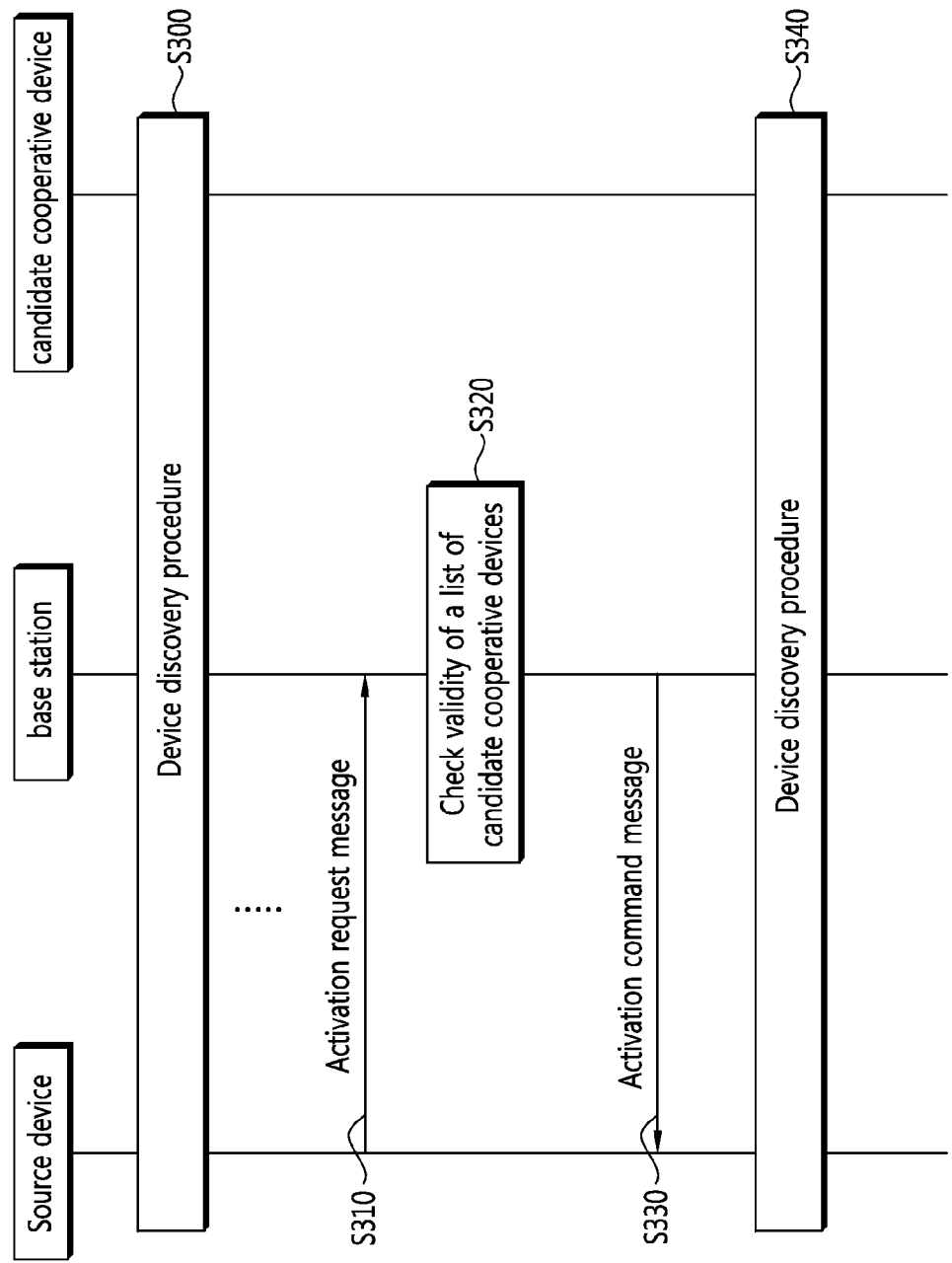
FIG. 9 shows an example of a method for setting a connection according to another embodiment of the present invention.

FIG. 9 shows an example of a method for setting a connection according to another embodiment of the present invention.

In step S300, as a result of the device discovery procedure, at least one candidate cooperative device is discovered. In step S310, the source device transmits the first activation request message to the base station. As described above in FIG. 7, the first activation request message may include such parameters as a list of candidate cooperative devices maintained by the source device, a list of neighbor device maintained by the source device, the latest timestamp of the list of candidate cooperative devices maintained by the source device, information about location of the source device, an indicator of whether to maintain the IEEE 802.16m connection, etc. In step S320, upon receiving the first activation request message from the source device, the base station determines whether the list of candidate cooperative devices is valid.

The base station may determine that the list of candidate cooperative devices is not valid. Also, the base station may not be able to perform a connection procedure since no device appropriate for client cooperation is available. In this case, in step S330, the base station transmits an activation command message to the source device. The activation command message may indicate a failure of the activation request from the source device. Also, the activation command message may include a cause of the failure (e.g., no valid list or no newly updated list) and an action code (re-execution of the device discovery procedure). In step S340, upon receiving the activation command message, the source device may perform the device discovery procedure again.

1) In what follows, the case where the connection procedure is initiated by the base station is described. The base station may communicate the source device by performing client cooperation by taking account of low link quality between the base station and the source device and other similar reasons. The method for setting a connection described above in FIGS. 7 to 9 may be applied similarly to the case where the connection procedure is initiated by the base station.

Figure 10:
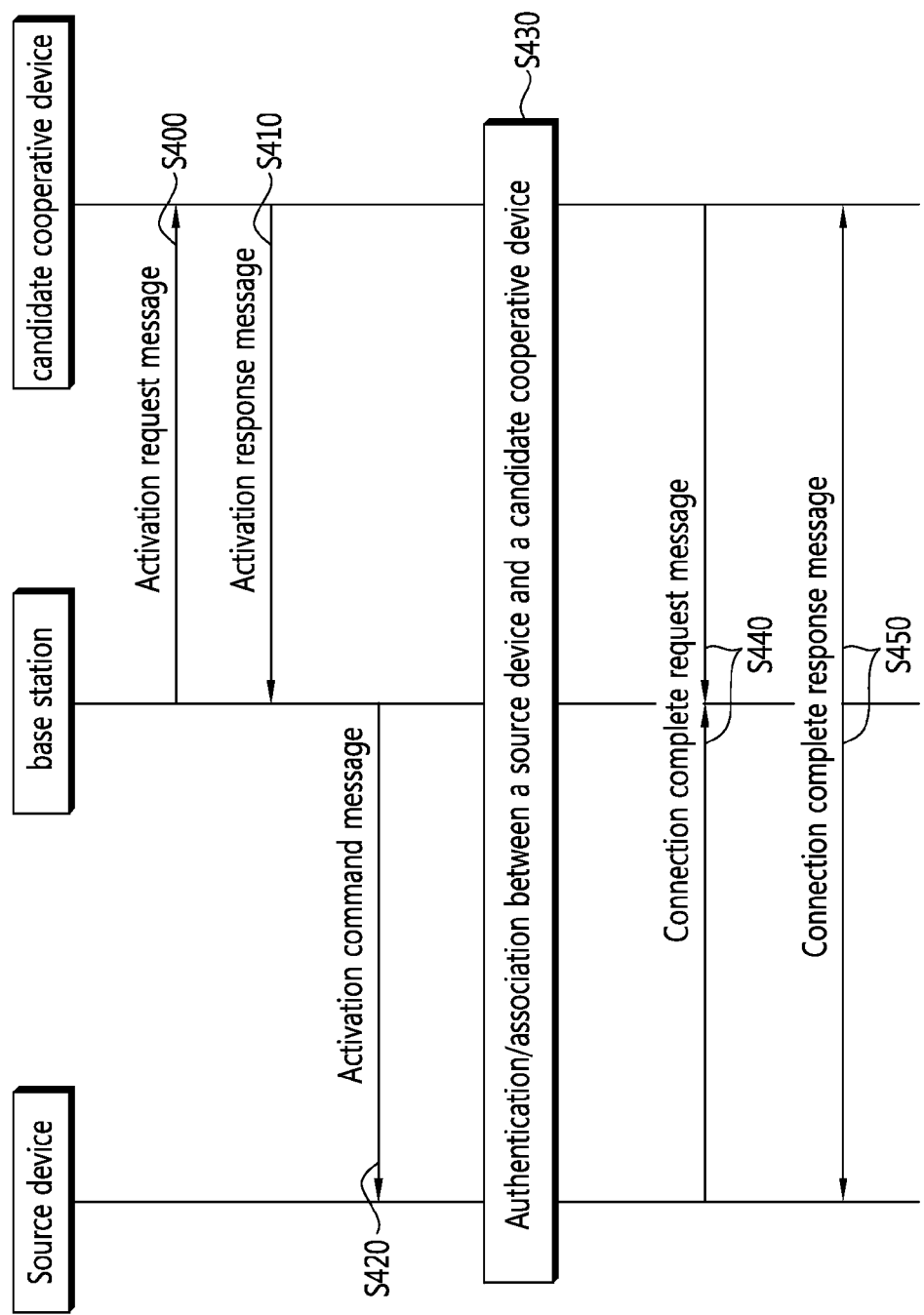
FIG. 10 shows an example of a method for setting a connection according to another embodiment of the present invention.

FIG. 10 shows an example of a method for setting a connection according to another embodiment of the present invention.

Once the list of candidate cooperative devices is validated, the base station may select candidate cooperative devices appropriate for client cooperation. At this time, the base station may select candidate cooperative devices appropriate for client cooperation based on speed, timestamp, and location information, etc., of the source device.

In step S400, the base station transmits an activation request message to the selected candidate cooperative device. In step S410, the base station receives from the selected candidate cooperative device an activation response message as a response to the activation request message. By exchanging the activation request message and the activation response message, the base station may negotiate the candidate cooperative device about an activation time point of RF for multi-RAT client cooperation, capability of performing client cooperation, etc. In step S420, the base station transmits an activation command message to the source device. The activation command message may include a result of the activation request of the source device. If the result of the activation request of the source device is successful, the activation command message may include such parameters as multi-RAT information of a candidate cooperative device capable of performing client cooperation, multi-RAT arbitrary connection time, an indicator of whether to maintain IEEE 802.16m connection, etc.

Upon receiving the activation command message, in step S430, the source device may perform an authentication and an association procedure for the candidate cooperative device. In step S440, the source device and the candidate cooperative device may each transmit a connection complete request message for client cooperation to the base station. Through the connection complete request message, a result of performing the authentication and the association procedure may be transmitted. In step S450, the base station transmits a connection complete response message for client cooperation to each of the source device and the candidate cooperative device. The connection complete response message may include an address to be used for multi-RAT client cooperation, security information of the IEEE 802.16m, an indicator of whether to maintain the IEEE 802.16m connection, etc.

Figure 11:
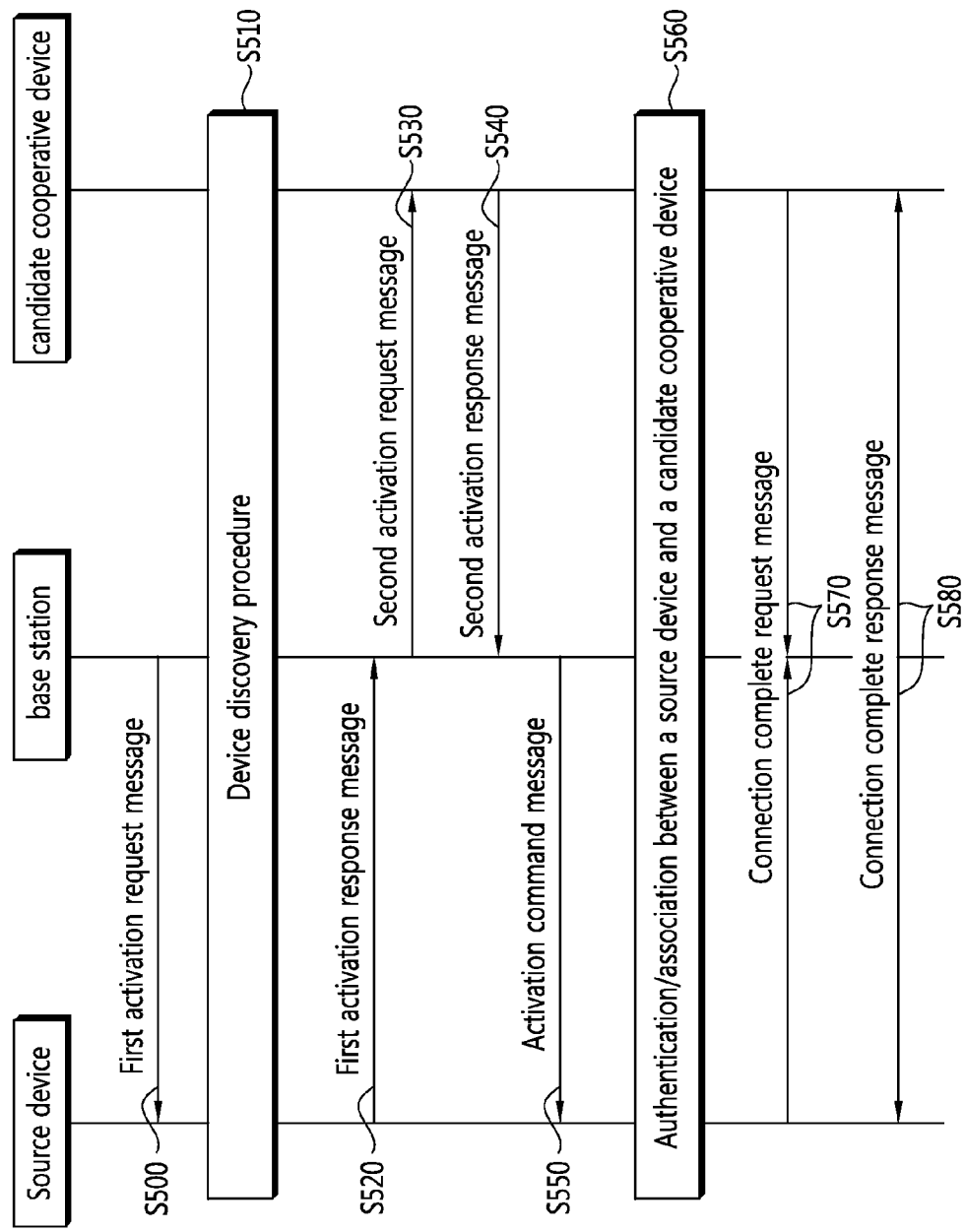
FIG. 11 shows an example of a method for setting a connection according to another embodiment of the present invention.

FIG. 11 shows an example of a method for setting a connection according to another embodiment of the present invention.

The base station may determine that the list of candidate cooperative devices is not valid. In step S500, the base station transmits a first activation request message to the source device.

Upon receiving the first activation request message, in step S510, the source device performs the device discovery procedure. In step S520, the source device transmits the first activation response message to the base station as a response to the first activation request message. At this time, the first activation response message may include such parameters as a list of candidate cooperative devices maintained by the source device, a list of neighbor devices maintained by the source device, the latest timestamp of the list of candidate cooperative devices maintained by the source device, information on location of the source device, an indicator of whether to maintain the IEEE 802.16m, etc.

Similarly, the source device may transmit the first activation response message including information for generating a list of candidate cooperative devices directly to the base station without performing the device discovery procedure. The information for generating the list of candidate cooperative devices may include location information of the source device.

Upon receiving the first activation response message from the source device, the base station may select a candidate cooperative device appropriate for client cooperation. In step S530, the base station transmits a second activation request message to the selected candidate cooperative device. In step S540, the base station receives a second activation response message as a response to the second activation request message from the selected candidate cooperative device. By exchanging the second activation request message and the second activation response message, the base station may negotiate consult the candidate cooperative device about an activation time point of RF for multi-RAT client cooperation, capability of performing client cooperation, etc. In step S550, the base station transmits an activation command message to the source device. The activation command message may include a result of the activation request of the source device. If the result of the activation request of the source device is successful, the activation command message may include such parameters as multi-RAT information of a candidate cooperative device capable of performing client cooperation, multi-RAT arbitrary connection time, an indicator of whether to maintain the IEEE 802.16m, etc.

Upon receiving an activation command message, in step S560, the source device may perform an authentication and an association procedure for the candidate cooperative device. In step S570, the source device and the candidate cooperative device may each transmit a connection complete request message for client cooperation to the base station. Through the connection complete request message, a result of performing the authentication and the association procedure may be transmitted. In step S580, the base station a connection complete response message for client cooperation to each of the source device and the candidate cooperative device. The connection complete request message may include and address used for multi-RAT client cooperation, security information of the IEEE 802.16m, a parameter indicating whether to maintain the IEEE 802.16m connection, etc.

In what follows, a procedure for checking validity of a list of candidate cooperative devices and holding time of each of the lists of candidate cooperative devices described in step S120 of FIG. 7, etc, is described in more detail.

The list of candidate cooperative devices may not be valid any time goes on, due to the effect of moving speed and/or location of the source device and each of candidate cooperative devices. For example, even though candidate cooperative devices which can support client cooperation of the source device have been discovered, the list of discovered candidate cooperative devices may not be valid any more as the source device moves. Therefore, it is necessary to check validity of the list of candidate cooperative devices before the source device and the candidate cooperative devices are connected to each other.

Also, the base station stores within itself a search result for each candidate cooperative device obtained through the device discovery procedure, namely a list of candidate cooperative devices for a single source device and information on APs adjacent to the source device. However, storing all of the device search results within the base station is inefficient in terms of storage space and costs. In addition, it is not necessary any more to store information on candidate cooperative devices of a source device for which direct connection to the base station is more advantageous and information on candidate cooperative devices of a source device which has no further data to communicate. Therefore, the base station needs to determine until when the search result for each of candidate cooperative devices has to be stored, and the source device needs to know until when its search result will be stored in the base station. Therefore, in addition to checking validity of the list of candidate cooperative devices, it may be required to determine holding time for the list of candidate cooperative devices with respect to the source device.

Validity of a list of candidate cooperative devices may be indicated by a list valid period timer within the base station and the source device. In other words, the list valid period timer indicates a time period during which a device discovery result is valid. Valid time of a list may be the same or different for each candidate cooperative device. If the valid time for each list of candidate cooperative devices is the same for each candidate cooperative device, the valid time may assume one from among the minimum value, average value, and maximum value of valid time of multiple lists of candidate cooperative devices. If each valid time of the lists of candidate cooperative devices is different from each other for the respective candidate cooperative devices, the valid time may be determined based on moving speed of the source device and/or each candidate cooperative device transmitted from the base station, or the valid time may be transmitted explicitly from the base station.

If a list of candidate cooperative devices is obtained while the list valid period timer is a deactivation state, the source device and the base station may configure and start their list valid period timer by using a predetermined value. Such a case may happen when the device discovery procedure is performed for the first time to obtain a list of candidate cooperative devices. If the device discovery result is updated while the list valid period timer is not terminated, the source device and the base station may reconfigure and then restart the list valid period timer. Similarly, if the list valid period timer expires without a further update of the device discovery result, the source device and the base station deactivates the list valid period timer.

Validity of a list of candidate cooperative devices may be checked by the source device or the base station. The source device may check validity of the list of candidate cooperative devices according to a condition of whether the list valid period timer is terminated, whether moving speed of the source device changes, or a timestamp value of the list of candidate cooperative devices maintained by the source device. If the condition above is met, the source device may perform the device discovery procedure again, figure out its absolute location and/or relative location, or figure out the receive state of a beacon message. Such a procedure may be performed before the connection procedure between the source device and the candidate cooperative device.

Also, the base station may determine that information of the corresponding list is outdated based on a condition of whether the list valid period timer is terminated, or whether moving speed of the source device is changed, or according to the timestamp value of the list of candidate cooperative devices received through an activation request message during the connection procedure between devices for client cooperation. Similarly, the base station may check validity of the list of candidate cooperative devices according to a condition of whether an estimate of a movement radius of devices due to moving speed thereof exceeds a predetermined range. If the condition above is met, the base station may make the source device perform the device discovery procedure again or may request transmission of location information of the source device. Similarly, the base station may command the candidate cooperative device to report whether the source device is found.

Meanwhile, separately from the list valid period timer, a list holding timer may be defined. A list holding timer indicates holding time during which the base station stores a search result for a particular candidate cooperative device, namely a list of candidate cooperative devices and information of neighbor APs of a particular source device. The holding time may be defined by a predetermined value or may be delivered to the source device by the base station. If the holding time is delivered to the source device, the holding time may be determined based on moving speed, link quality, etc., of the source device. The source device and the base station start the list holding timer at the time when the list of candidate cooperative devices is updated and/or communicated. At this time, if the list holding timer is already in operation, the corresponding timer is reconfigured and starts over. Similarly, if the list holding timer expires, the base station may delete a search result for the corresponding source device and information on the corresponding source device.

If the list holding timer is still in operation and the source device transmits an activation request message for client cooperation to the base station, the activation request message may not include the list of candidate cooperative devices maintained by the source device. This is so because the list holding timer in the source device and the base station is still in operation, and thus the list of candidate cooperative devices is still stored within the base station. On the other hand, if the list holding timer expires and the source device transmits an activation request message for client cooperation to the base station, the activation request message may include the list of candidate cooperative devices maintained by the source device. This is so because the base station no longer stores a device discovery result of the corresponding source device. Meanwhile, in the case of the above situation, the list of candidate cooperative devices is considered to be valid.

Figure 12:
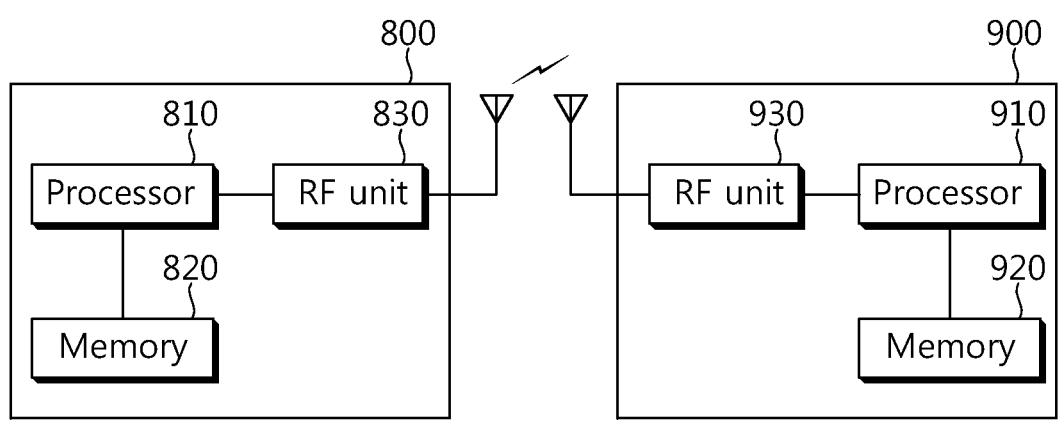
FIG. 12 is a block diagram showing wireless communication system to implement an embodiment of the present invention.

FIG. 12 is a block diagram showing wireless communication system to implement an embodiment of the present invention.

ABS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for performing, by a base station, cooperative communication in a wireless communication system, the method comprising:
receiving a list of at least one neighbor UE searched by a UE;
after receiving the list of at least one neighbor UE, starting a list valid period timer; and
restarting the list valid period timer when the list of at least one neighbor UE is updated before the list valid period timer expires.

2. The method of claim 1, wherein the list of at least one neighbor UE is valid before the list valid period timer expires.

3. The method of claim 1, further comprising receiving the updated list of at least one neighbor UE before the list valid period timer expires.

4. The method of claim 1, wherein the list of at least one neighbor UE is updated when at least one UE is added to the list of at least one neighbor UE or at least one UE is removed from the list of at least one neighbor UE.

5. The method of claim 1, wherein the base station and the UE is connected via a first system,
wherein the at least one neighbor UE and the UE is connected via a second system.

6. The method of claim 5, wherein the first system is one of institute of electrical and electronics engineers (IEEE) 802.16, IEEE 802.16m, IEEE 802.20, evolved-UMTS terrestrial radio access (E-UTRA), $3^{rd}$ generation partnership project (3GPP) long-term evolution (LTE), 3GPP LTE-A (advanced), or IEEE 802.11, and
the second system is one of IEEE 802.16, IEEE 802.16m, IEEE 802.20, E-UTRA, 3GPP LTE, 3GPP LTE-A, or IEEE 802.11.

7. The method of claim 1, wherein the UE corresponds a source device in the cooperative communication, and
the at least one neighbor UE corresponds to candidate cooperative device in the cooperative communication.

8. A method for performing, by a user equipment (UE), cooperative communication in a wireless communication system, the method comprising:
starting a list valid period timer when at least one neighbor UE is searched; and
restarting the list valid period timer when the searched result of at least one neighbor UE is updated before the list valid period timer expires.

9. The method of claim 8, further comprising transmitting a list including the updated searched result of at least one neighbor UE to a base station.

10. The method of claim 9, wherein the list valid period timer is restarted after transmitting the list to the base station.

11. The method of claim 9, wherein the list valid period timer is restarted before transmitting the list to the base station.

12. The method of claim 8, wherein the searched result of at least one neighbor UE is updated when at least one UE is additionally searched or at least one UE is no longer searched.

13. The method of claim 8, wherein a base station and the UE is connected via a first system,
wherein the at least one neighbor UE and the UE is connected via a second system.

14. The method of claim 13, wherein the first system is one of institute of electrical and electronics engineers (IEEE) 802.16, IEEE 802.16m, IEEE 802.20, evolved-UMTS terrestrial radio access (E-UTRA), $3^{rd}$ generation partnership project (3GPP) long-term evolution (LTE), 3GPP LTE-A (advanced), or IEEE 802.11, and
the second system is one of IEEE 802.16, IEEE 802.16m, IEEE 802.20, E-UTRA, 3GPP LTE, 3GPP LTE-A, or IEEE 802.11.

15. The method of claim 8, wherein the UE corresponds a source device in the cooperative communication, and
the at least one neighbor UE corresponds to candidate cooperative device in the cooperative communication.

* * * * *